United States Patent Office 3,441,326
Patented Apr. 29, 1969

3,441,326
THRUST BEARING FOUNDATION AND
MOUNTING
Gerald C. Swensson, Media, Pa., assignor to Sun Shipbuilding & Dry Dock Company, Chester, Pa., a corporation of Pennsylvania
Filed June 16, 1967, Ser. No. 646,714
Int. Cl. F16c 17/00
U.S. Cl. 308—161        11 Claims

ABSTRACT OF THE DISCLOSURE

The thrust load is transmitted from the casing of a thrust bearing directly to the structural foundation through a set of four chocks, which are located at the four corners of the bearing and are loaded in compression. Four chocks, arranged transversely of the bearing under the lower bearing casing flanges, enable vertical adjustment of the bearing.

---

This invention relates to a thrust bearing foundation and mounting, particularly applicable to thrust bearings of a substantial size.

Heretofore, the conventional arrangement used for mounting and fastening thrust bearings of large size involved the transmission of the thrust load from the upper and lower thrust bearing casings to the structural foundation through a series of heavy, fitted bolts. These fitted bolts, all loaded in shear, were arranged in parallel rows on each side of the bearing, the rows extending parallel to the longitudinal axis of the shaft supported by the bearing.

With increased load ratings, the thrust casing flanges had to be made disproportionately larger, to provide the bolting area for the fitted bolts. This is disadvantageous since it results in an increase in the installation labor hours.

Initial installation and alignment of the thrust bearing required many man-hours of labor, because of the necessity of machining of the foundation for the fitted bolts; this machining had to be done after the foundation was installed and was rather extensive because of the large number of fitted bols required to constrain the thrust.

In addition to the initial alignment of the thrust bearing, the thrust bearing may have to be realigned after final weighing of line shaft bearing reactions, as a result of the recent trend of increased axial distance between the thrust bearing and the main reduction gears. A change in transverse position of the thrust bearing required redrilling of the foundation for the fitted bolts, involving additional extensive machining. Also, foundation stiffening members, located longitudinally between the rows of fitted bolts, seriously limited the latitude of relocation of the bolt holes.

Vertical alignment of the thrust bearing required a large number of fitted chocks under the lower bearing casing, the number of these chocks being approximately one-half the total number of fitted bolts. The repetitive handling of many parts, such as chocks and bolts, adds to the labor man-hours.

An object of this invention is to provide a novel thrust bearing foundation and mounting arrangement.

Another object is to provide a thrust bearing foundation and mounting arrangement which effects a substantial reduction in the man-hours of labor required for a complete installation, as compared to prior arrangements.

A further object is to provide a thrust bearing foundation and mounting arrangement which enables utilization of a thrust bearing casing which is smaller and lighter than those formerly required.

A still further object is to provide a thrust bearing foundation and mounting arrangement which is substantially simpler in construction than prior arrangements, in that it comprises a substantially smaller number of parts.

The objects of this invention are accomplished, briefly, in the following manner: An open-topped box-like structure is rigidly secured to supporting structure, for example, the structure of a ship, to provide a thrust bearing foundation. The box has at opposite sides thereof a pair of horizontal supporting shelves which support the thrust bearing and also has, at the four corners of the bearing, buttresses with vertical faces. Four tapered transverse chocks are interposed in a horizontal plane, between the casing of the thrust bearing and the shelves, for support of the bearing by the shelves. At its four corners, the ends of the bearing casing engage respective tapered transversely-extending thrust chocks in a vertical plane, which transmit the thrust load to the vertical faces of the buttresses.

A detailed description of the invention follows, taken in conjunction with the accompanying drawings, wherein.

Figure 1:
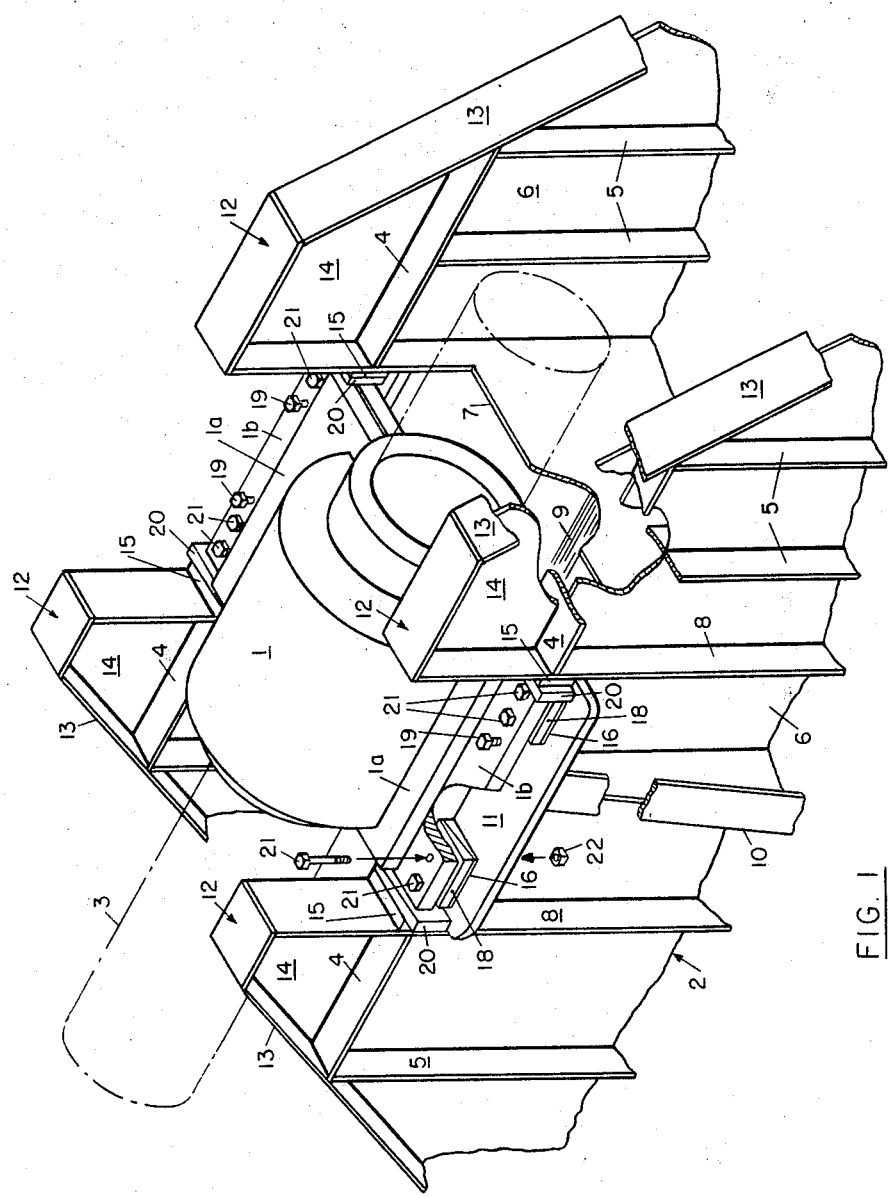
FIG. 1 is an isometric view, partly broken away, of a thrust bearing foundation and mounting arrangement according to this invention.

Referring now to the drawings, and particularly to FIG. 1 thereof, the foundation for the thrust bearing assembly 1 comprises an open-topped box-like structure denoted generally by numeral 2. The bearing 1 is of more or less conventional construction, and serves as a bearing for a thrust shaft 3 outlined in phantom in FIG. 1. For purposes of illustration, it will be assumed that the thrust force on shaft 3 (in the longitudinal direction of the shaft) acts from left to right in FIG. 1.

The two side walls of the box 2 are of steel plate and flange construction. That is to say, the horizontally-extending plates 4 are welded to the upper edges of the two respective side plates 6 of the box to form upper flanges for the box, while various vertically-extending members 5 are edge-welded to plates 4 and to the side plates 6 to form vertical flanges for the box. Members 5 are duplicated on the inner and outer faces of plates 6. The plates 4 and members 5 strengthen and add rigidity to the side plates 6. Near each end thereof, and adjacent to the respective opposite ends of bearing 1, box 2 is internally braced with respective vertical rectangular plates 7, each one of which is welded at its edges to the respective side plates 6. A horizontal rectangular plate 9 also provides internal bracing for box 2; plate 9 in effect forms the bottom of the box and is welded at its edges to the inner faces of the two oppositely-disposed plates 7 and to the inner faces of the side plates 6.

Box 2 is externally braced, near the midpoints of each of the two longer sides 6 thereof, by respective vertical gussets 10 of T-beam construction, the legs of the Ts being welded to the outer faces of the respective side plates 6.

Two oppositely-disposed flat shelf-like plates 11 are welded longitudinally one on the top of each respective side 6 of the box, near the midpoints of these sides. The upper ends of the gussets 10 are welded to the lower faces of the respective shelves 11. The shelves 11 provide the horizontal mounting surfaces for the thrust bearing 1. It may be noted that each shelf 11 extends between a pair of corresponding members 8, on the same side of box 2. The four members 8 are edge-welded to the outer faces of side plates 6, two opposite members 8 being aligned with each one of vertical plates 7 and there being two members 8 on each side of box 2.

Box 2 is braced longitudinally at each of its four corners by a respective heavy buttress 12 of plate and flange construction. The tops of the buttress 12 rise above the top of the thrust bearing assembly 1. The upper ends of the members 8 form the vertical faces of the buttresses, while the previously-described plates 4 form the lower ends of the respective buttresses. Sloping plates 13, which are welded to the edges of the respective box side plates 6 and to the edges of the respective buttress plates 14, provide outer end flanges for the buttresses and also for the box 2.

A tapered transversely-extending thrust pad 15 is welded to the vertical face of each respective one of the four buttresses 12 (i.e., to the inner face of the upper end of each respective member 8), at a location just above the horizontal mounting plates or shelves 11. The taper of pads 15 is such that the thickness of the pads increases as one moves horizontally along the faces of the pads, from the outer end to the inner end thereof. It will be appreciated that the faces of all four of the pads 15 lie in vertical planes. The outer face of each of the four pads 15 provides a respective fixed abutment face.

Two tapered transverse mounting pads 16 are welded to the upper face of each of the two shelves 11, one pad 16 being located near each of the two ends of each of the two shelves. The taper of pads 16 is such that the thickness of the pads increases as one moves substantially horizontally along the faces of the pads, from the outer end to the inner end thereof. It will be appreciated that the faces of all four of the pads 16 lie in planes which are inclined from the horizontal by the degree of taper.

The entire thrust box assembly, complete with bracing plates 7 and 9, vertical bracing gussets 10, buttresses 12, horizontal mounting plates 11, longitudinal thrust pads 15, and transverse mounting pads 16, may be constructed as a shop subassembly, and the shop work would include machining of the tapered faces of both the longitudinal thrust pads 15 and the transverse mounting pads 16.

Figure 2:
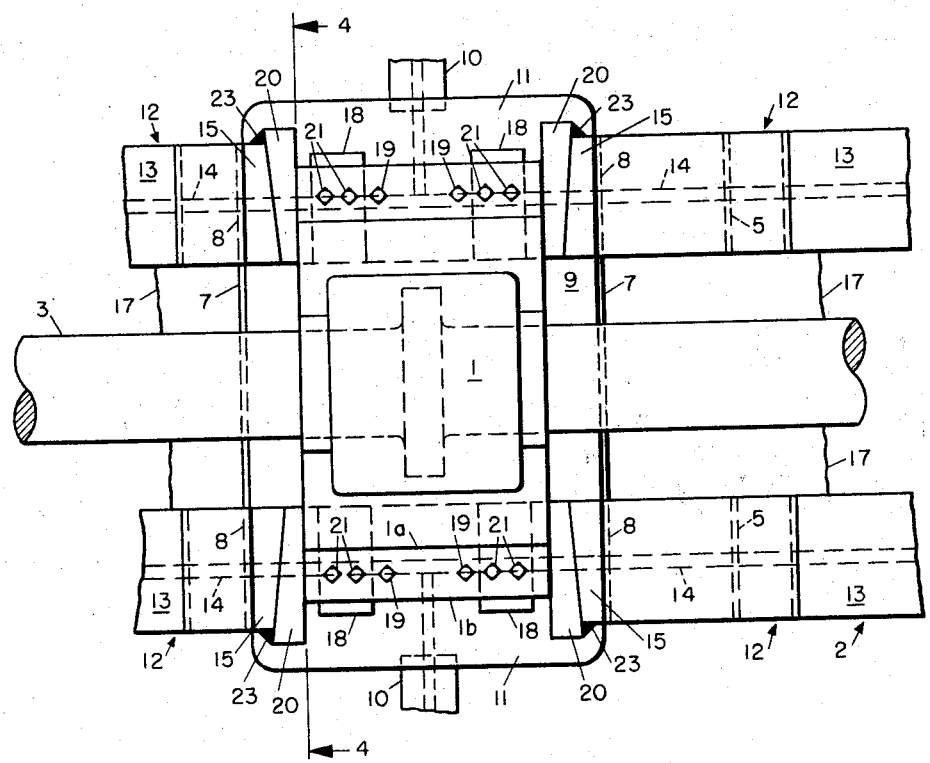
FIG. 2 is a top or plan view of the arrangement of the invention.
Figure 3:
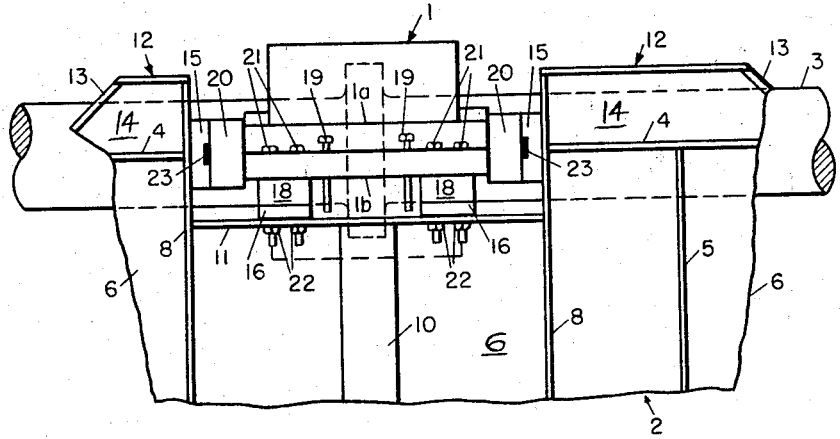
FIG. 3 is a side elevation of the foundation and mounting arrangement.
Figure 4:
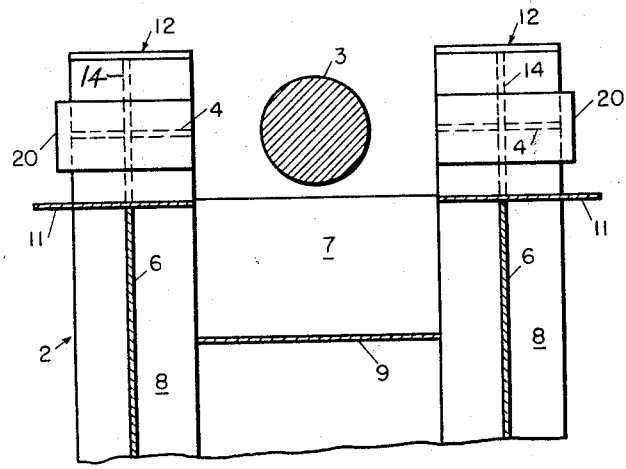
FIG. 4 is a vertical (transverse) section taken on line 4—4 of FIG. 2.

After the aforementioned shop work is completed, the thrust box assembly, which constitutes the major portion of the thrust bearing foundation, is installed at the design location, for example aboard a ship, and is welded to the ship structure as a unit. A portion of the underlying supporting structure is illustrated at 17 in FIG. 2.

If the design calls for the thrust bearing assembly 1 to be located in the ship immediately forward or aft of the after engine room bulkhead, the forward or aft buttresses 12 may be modified, at the time of shop subassembly, so that they may be tied into the after engine room bulkhead by suitably braced vertical plating. This arrangement will result in transmitting the thrust force both horizontally and vertically into the ship structure, resulting in a more rigid thrust bearing foundation.

After the thrust box assembly is secured, the thrust shaft 3 (for example, the ship propeller shaft), with the assembled thrust bearing 1, is lowered into position in box 2 and temporarily held in position by the line shaft bearings and/or wood chocks, during gap and sag alignment.

The thrust bearing 1 has an upper, outwardly-flanged casing portion 1a and a lower, outwardly-flanged casing portion 1b, which are secured together in a conventional manner. The flanges of casing portion 1b extend outwardly (i.e., transversely from the casing body) beyond the flanges of casing portion 1a, at both sides of the bearing assembly. When the bearing assembly 1 is positioned within the foundation, the oppositely-disposed flanges of casing portion 1b respectively overlie the two shelves 11.

For mounting of the thrust bearing assembly 1, an individual tapered transverse chock 18 is placed (somewhat loosely) atop each respective one of the transverse mounting pads 16. The taper of chocks 18 is opposite in sense to that of the pads 16.

After all shafting is coupled, the thrust bearing casing 1a–1b is positioned to the center line of shaft 3 by suitable temporary means in the transverse direction and by jacking bolts in the vertical direction. In this connection, it is noted that during this initial alignment or positioning there are no significant forces in the transverse direction; therefore, positioning the casing in the transverse direction is not a particular problem. Any suitable temporary means is used to hold the transverse position of the casing 1a–1b while the vertical and longitudinal positioning is being done.

Four jacking bolts 19 are threaded through the flanges of the lower casing portion 1b to bear against the upper faces of shelves 11, one of the jacking bolts 19 being located near each respective corner of the thrust bearing assembly 1 but in non-overlying relation to pads 16 and chocks 18. Vertical alignment of the thrust bearing casing 1a–1b with the shaft center line is accomplished by turning the jacking bolts 19, thus raising or lowering the thrust bearing casing 1a–1b. Transverse chocks 18 are tightened or loosened, as necessary, to suit vertical alignment, and provide the permanent vertical support for the bearing casing 1. After the transverse chocks 18 are fitted, the jacking bolts 19 are withdrawn.

For transmitting the thrust load from the thrust bearing casing 1a–1b directly to the bearing foundation 2, and thence to the structural foundation, as well as for enabling longitudinal adjustment of the thrust bearing casing, four tapered transversely-extending thrust chocks are utilized. Chocks 20 are located one at each of the four corners of the bearing assembly 1, and fit between the ends of the lower thrust bearing casing portion 1b and the respective transversely-extending thrust pad 15. The chocks 20 contact both the thrust bearing casing portion 1b and the thrust pads 15, and are thus loaded in compression. The taper of chocks 20 is opposite in sense to that of the pads 15. Thus, one active face of each of the chocks 20 engages the fixed abutment provided by a respective pad 15, and the other active face engages the bearing casing. Since the thrust bearing casing portions 1a and 1b are positioned to the center line of shaft 3, and since the chocks 20 contact the casing portion 1b and the thrust pads 15 (which latter are mounted on the vertical faces of the respective buttresses 12, and thus constitute respective rigid abutment faces), it may be seen that the transmission of the compressive force to the foundation 2 takes place substantially in the transverse mid-plane of shaft 3, and also that the compressive force is transmitted directly to the foundation from the casing 1, by way of chock members 20.

The longitudinal alignment of the thrust bearing casing 1a–1b is adjusted by means of the four tapered chocks 20.

When alignment of the thrust bearing casing is satisfactory in all three directions—to wit, vertically, transversely, and longitudinally, eight bolt holes are drilled through the transverse chocks 18, the transverse mounting pads 16, and the horizontal shelves 11. The bolt holes provided in the lower thrust bearing casing flange 1b serve as locating guides for drilling the aforementioned holes, there being two holes located at each of the four transverse chocks 18. Bolts 21 are slipped through the drilled holes, then nuts 22 are added and drawn up wrench tight against the underside of shelves 11.

The entire shafting assembly is then spin tested, and line shaft bearing reactions are weighed.

If line shaft bearing positions have been adjusted and it becomes necessary to realign the thrust bearing assembly 1, this is readily accomplished. Bolts 21 and nuts 22 are loosened, and vertical alignment is adjusted by moving the transverse centering chocks 18 either toward or away from the thrust shaft 3. Longitudinal alignment is taken care of by moving thrust chocks 20 either toward or away from the thrust shaft 3.

Of course, it may be necessary, as a result of the realignment mentioned in the preceding paragraph, to redrill the holes for bolts 21. However, only eight holes would need to be redrilled, as an absolute maximum number, and even these holes do not need to be drilled to such close tolerances as are required for those drilled for fitted bolts which are to be loaded in shear. There is zero lateral force on bolts 21, and the bearing support reaction is transmitted vertically from shelves 11 through pads 16 and chocks 18 to bearing flange 1*b*; this last-mentioned reaction has a magnitude equal to the weight of the thrust bearing 1 plus the friction torque (when shaft 3 is rotating).

If the thrust load be in the direction from left to right in FIG. 1, as previously assumed, then one-half of the total thrust load is transmitted through each of the two right-hand thrust chocks 20 and thrust pads 15, to the vertical faces of the right-hand buttresses 12, which are part of the structural foundation.

It should be apparent that, if the thrust load is in the opposite direction, that is, from right to left in FIG. 1, one-half of the total thrust would be transmitted through each of the two left-hand thrust chocks 20 and thrust pads 15, to the vertical faces of the left-hand buttresses 12, which are part of the structural foundation (ship foundation, or ship structure).

When final alignment is satisfactory, bolts 21 and nuts 22 are made up wrench tight. The thrust chocks 20 are then tack welded to the respective longitudinal thrust pads 15 at points 23 (FIG. 2), to prevent them slipping out of position.

It may be here noted that the bearing 1 is held finally in the transverse direction by the wedging of the chocks 20, by the bolts 21, and by the welds 23.

Summarizing, according to this invention the thrust load is transmitted directly to the foundation through the set of four chocks 20 which are arranged at the ends of the bearing and are loaded in compression. No thrust load is transmitted through fitted bolts loaded in shear.

The arrangement of this invention permits the thrust bearing casings to be made smaller and lighter, since casing flanges of large area are no longer required for fitted bolts.

Initial vertical alignment of the thrust bearing assembly 1 is easily accomplished by the use of the four jacking bolts 19.

Realigning of the bearing, if needed after final weighing of line shaft bearing reactions, is readily accomplished, since fitted bolts no longer restrict the run of the center line of shaft 3. Vertical alignment can be changed by resetting the four transverse chocks 18 under the lower bearing housing 1*b*, and transverse and longitudinal alignment can be changed by resetting the four chocks 20 at the corners of the bearing. These changes can be accomplished without the necessity of extensive remachining, or of refitting.

A substantial reduction in man-hours of labor results from a large reduction in the quantity of parts to be handled (as compared to prior arrangements), and also from elimination of "in place" machining of foundation pad surfaces; this latter machining can now be accomplished at the time of shop fabrication of the foundation.

An additional reduction in labor costs results from a more accessible work space, both for installation and for drilling of the four alignment chocks 18. In this connection, it may be noted that the space above the shelves 11, on both sides of the foundation, is accessible from both top and sides. Also, the ease of realignment of the entire thrust bearing assembly 1 beneficially results in a further reduction in labor costs.

The invention claimed is:

1. In combination, a shaft subject to thrust forces, a thrust bearing for mounting said shaft, said bearing having a rigid casing to which a longitudinally-directed thrust force is transmitted from the shaft, a portion of said casing extending outwardly with respect to said shaft substantially in the transverse mid-plane thereof; a bearing foundation having means providing a rigid abutment face; means carried by said foundation and engaging said casing for support of said bearing by said foundation in such a position that one face of said casing portion is in juxtaposition with said abutment face, and a compressively-loaded member engaging both said one face of said casing portion and said abutment face for causing transmission, from said casing, of said thrust force as a compressive force directly to said foundation, the transmission of said compressive force to said foundation taking place substantially in the transverse mid-plane of said shaft.

2. Combination according to claim 1, wherein said abutment face is planar and lies at substantially 90° to the axis of said shaft.

3. Combination according to claim 1, wherein said member comprises a tapered chock one active face of which engages said one face of said casing portion and the other active face of which engages said abutment face.

4. Combination recited in claim 1, wherein said second-mentioned means includes a tapered chock one active face of which engages said foundation and the other active face of which engages said casing, and wherein said member comprises a tapered chock one active face of which engages said one face of said casing portion and the other active face of which engages said abutment face.

5. Combination defined in claim 1, wherein said second-mentioned means includes a tapered chock one active face of which engages said foundation and the other active face of which engages said casing.

6. In combination, a shaft subject to thrust forces, a thrust bearing for mounting said shaft, said bearing having a rigid casing to which a longitudinally-directed thrust force is transmitted from the shaft, said casing having a pair of portions extending outwardly in respective opposite directions with respect to said shaft substantially in the transverse mid-plane thereof; a bearing foundation having means providing a pair of rigid abutment faces; means carried by said foundation and engaging said casing for support of said bearing by said foundation in such a position that one face of each of said casing portions is in juxtaposition with a respective one of said abutment faces, and a pair of separate compressively-loaded members, each of which engages a respective one of said casing portion faces and the corresponding juxtaposed abutment face, for causing transmission, from said casing, of said thrust force as a compressive force directly to said foundation, the transmission of said compressive force to said foundation taking place substantially in the transverse mid-plane of said shaft.

7. Combination according to claim 6, wherein each of said abutment faces is planar and each lies at substantially 90° to the axis of said shaft.

8. Combination according to claim 6, wherein each of said members comprises a separate tapered chock one active face of which engages a respective one of said casing portion faces and the other active face of which engages the corresponding juxtaposed abutment face.

9. Combination defined in claim 6, wherein said second-mentioned means includes a tapered chock one active face of which engages said foundation and the other active face of which engages said casing.

10. Combination recited in claim 6, wherein said second-mentioned means includes a tapered chock one active face of which engages said foundation and the other active face of which engages said casing, and wherein each of said members comprises a separate tapered chock one active face of which engages a respective one of said casing portion faces and the other active face of which engages the corresponding juxtaposed abutment face.

11. Combination recited in claim 6, wherein said second-mentioned means includes a plurality of spaced tapered chocks one active face of each of which engages said foundation and the other active face of each of which engages said casing, and wherein each of said members comprises a separate tapered chock one active face of which engages a respective one of said casing portion faces and the other active face of which engages the corresponding juxtaposed abutment face.

References Cited

UNITED STATES PATENTS

| | | | |
|---|---|---|---|
| 388,227 | 8/1888 | Smith | 308—162 |
| 2,004,562 | 6/1935 | Blackburn | 308—59 |
| 2,541,080 | 2/1951 | Lyon | 308—59 |

MARTIN P. SCHWADRON, *Primary Examiner.*

FRANK SUSKO, *Assistant Examiner.*